United States Patent [19]

Shuster

[11] Patent Number: 4,555,454
[45] Date of Patent: Nov. 26, 1985

[54] REINFORCED CONSUMABLE ELECTRODE, ELECTROCHEMICAL CELL AND METHOD

[75] Inventor: Nicholas Shuster, Willoughby Hills, Ohio

[73] Assignee: Gould, Inc., Rolling Meadows, Ill.

[21] Appl. No.: 724,322

[22] Filed: Apr. 17, 1985

[51] Int. Cl.[4] .......................... H01M 2/38; H01M 4/12
[52] U.S. Cl. ....................................... 429/51; 429/67; 429/81; 429/212
[58] Field of Search ................. 429/67, 212, 217, 118, 429/119, 81, 234, 235, 50

[56] References Cited

U.S. PATENT DOCUMENTS 3,791,871  2/1974  Rowley ........................... 136/100 R
4,269,907  5/1981  Momyer et al. ...................... 429/67

Primary Examiner—Donald L. Walton
Attorney, Agent, or Firm—Wood, Dalton, Phillips, Mason & Rowe

[57] ABSTRACT

A consumable metal electrode incorporates a fibrous reinforcing network of electrically insulating material extending through at least a portion of the body of the electrode and disposed in close proximity to a surface of the electrode which will be contacted by liquid electrolyte and eroded during operation of an electrochemical cell incorporating the electrode. Local turbulence is generated by the fibrous network at the electrode surface during operation of the cell in order to maximize electrical output.

22 Claims, 7 Drawing Figures

REINFORCED CONSUMABLE ELECTRODE, ELECTROCHEMICAL CELL AND METHOD

BACKGROUND OF THE INVENTION

1. Field of the Invention

This invention generally relates to electrodes useful in electrochemical cells and, more particularly, this invention relates to reinforced composites of reactive metals useful as electrodes in electrochemical cells.

2. Description of the Prior Art

Electrochemical cells utilizing reactive metal electrodes are well known. See, for example, Rowley U.S. Pat. No. 3,791,871 issued Feb. 12, 1974, wherein a cell using an aqueous electrolyte, an anode of an alkali metal, such as lithium, for example, and a cathode spaced from the anode is disclosed.

In such prior cells, the electrolyte may be aqueous or non-aqueous, and the cathode may comprise an electrochemically active or passive metal, such as silver oxide or iron, respectively, or a gas consuming electrode, such as an air cathode, for example. All such cells are characterized, however, by an electrochemical reaction which occurs between the reactive metal of the anode (or cathode) and the electrolyte, whereby the reactive metal is consumed.

As a result of the electrochemical reaction and the consequent consumption of reactive metal, the surface of the reactive metal electrode is eroded during operation of the cell.

Since the production of electrochemical energy depends directly upon the rate of reaction of the reactive metal with the electrolyte, it is important to promote turbulence at the surface of the reactive metal electrode in order to maximize the rate of reaction by carrying away products of reaction and providing fresh electrolyte to unreacted metal.

Some prior reactive metal cells have utilized rigid screens or open cell or reticulated polymer foam as inter-electrode separators in order to promote turbulence. However, the initial inter-electrode gap is generally fixed and, as the consumable metal electrode erodes, the gap widens and the turbulence promoting effect of such separators is decreased.

As an electrode is eroded during operation and the inter-electrode gap increases, the electrode sensitivity to shock and vibration may increase due to the decreased support which results from the widening of the inter-electrode gap.

Storage problems may occur in prior cells utilizing polymer foam as inter-electrode spacers where the foam is stored in the cell in a compressed state. If stored over a period of years, such foam can lose its resilience and thus its ability to expand to fill the inter-electrode gap during subsequent operation. As a result, deleterious electrolyte flow-by may be experienced.

The use of multicell power modules comprising many electrode pairs is well known. The assembly of such modules is complicated by the use of discrete individual foam separator layers as inter-electrode spacers.

SUMMARY OF THE INVENTION

It is an object of the invention to overcome one or more of the problems described above.

According to the present invention, an electrode of a consumable reactive metal is reinforced by a fibrous network of electrically insulating reinforcing material which is at least partially embedded in the electrode, with at least a portion of the network disposed in close proximity to a surface of the electrode which reacts with electrolyte during operation of an electrochemical cell incorporating the electrode. As the surface erodes, the fibers of the network are exposed, and promote turbulence at the surface.

The fibrous network may be in the form of a plurality of discrete individual fibers, bundles of such fibers, or in the form of a reticulated foam network. If a foam, the network may be rigid (e.g., in the form of a screen) or of a resilient compressible material.

In a preferred embodiment utilizing a compressible foam, the foam expands away from the surface of the eroding electrode during operation in order to continuously provide a turbulence-promoting separator material in the gap between the reinforced electrode and its counter electrode.

The invention comprehends, in addition to the electrode, an electrochemical cell incorporating the electrode and a method of generating electrical energy using the cell.

The inventive electrode, cell and method provide ease of operation and assembly, enhanced electrolyte turbulence at the electrode surface, which in turn promotes enhanced length of full power operation, eliminate problems which result from loss of resilience of foam separators, and result in positive maintenance of interelectrode spacing.

Other objects and advantages of the invention will be apparent to those skilled in the art from the following detailed description, taken in conjunction with the drawings and appended claims.

DETAILED DESCRIPTION OF THE INVENTION

Figure 1:
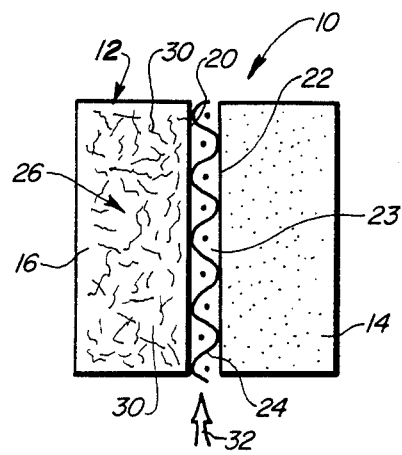
FIGS. 1-3 schematically illustrate an electrochemical cell incorporating one embodiment of the electrode of the invention at various stages of cell operation.

According to the invention, an improved electrode useful in an electrochemical cell for the generation of electrical energy is provided wherein a solid body of a reactive metal which is consumable by reaction with a liquid electrolyte is provided with a fibrous network of electrically insulating reinforcing material at least partially imbedded therein. At least a portion of the network is disposed in close proximity to at least one surface of the electrode body which will be contacted with a liquid electrolyte during operation of the cell.

The electrode of the invention may function as either a cathode or anode in an electrochemical cell in which an anode and cathode are spaced from each other to define a reaction space for the flow of liquid electrolyte. As is well known in the art, the anode and cathode are externally connected to a load by means defining an electrical circuit.

The body of the electrode may be in any desirable form, such as a disc, plate, cylinder, etc. and preferably comprises a reactive alkali metal, such as sodium or lithium, for example. Lithium is a highly preferred metal for use in an anode.

The reactive metal may be present in elemental, compound, complex, alloy or amalgam form. In the past, alloys of alkali metals have been used in anodes in order to improve the mechanical strength of such anodes. However, according to the invention, the fibrous reinforcing material adds mechanical strength to the anode, thus eliminating the necessity for alloying materials in some cases.

The presence of a fibrous reinforcement according to the invention improves the hardness of the electrode, and also may allow a reduction in thickness thereof since the strength per unit thickness of the electrode may be increased. The higher strength which may result from the invention decreases shock and vibration sensitivity of the electrode. In cells wherein a solid separator, such as a screen, is disposed between the two electrodes of the cell, the use of the invention minimizes extrusion of the reactive metal around the separator under the compressive forces sometimes present in fabrication or operation of the cell.

In cases wherein enhanced electrode strength is obtained according to the invention, the need to introduce alloying materials into the system is eliminated.

As set forth in more detail below, one important advantage of the invention is the promotion of turbulence of the eroding surface of a reactive metal electrode by extension of the fibrous reinforcing material from the eroding surface. This directly results in a higher reaction rate between the reactive metal and the electrolyte, thus minimizing the required flow rate and/or concentration adjustments to the electrolyte in order to obtain the desired power output level. In some embodiments, as set forth in more detail below, the use of a resilient compressible foam as the reinforcing material provides separation between the electrodes of the cell and prevents by-passing of the electrode surface by electrolyte.

The fibrous reinforcing material may be present in the form of discrete fibers or bundles thereof, or in the form of a reticulated foam, which may be either compressible or rigid. The fibrous material should be electrically insulating, but, if desired, may comprise an electrically conductive and, preferably, heat conductive material provided with a thin electrically insulative coating. The use of a heat conductive material enhances the rate of heat removed from the reaction space of a cell incorporating the electrode, thus facilitating temperature control, which may affect control of the reaction rate and rate of power output.

In the Figures which illustrate certain embodiments of the invention, the circuit-defining means and the load powered by the cell are not shown, for simplicity. Common reference numerals designate common elements of the embodiments shown in the various Figures.

Figure 2:
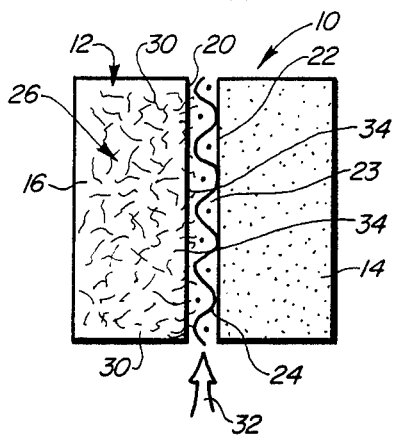
Figure 3:
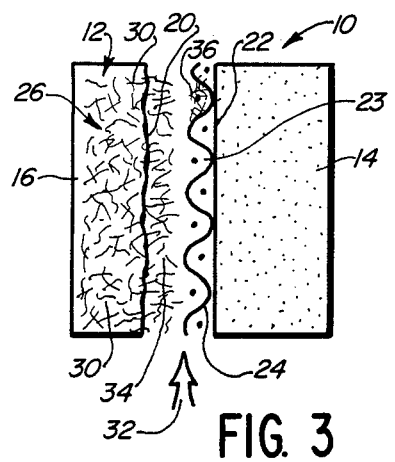

FIGS. 1-3 illustrate an electrochemical cell, generally designated 10, comprising an anode 12 made according to the invention spaced from a cathode 14. The cathode is illustratively of porous silver oxide (AgO), but may comprise any suitable type of cathode, such as a gas consuming cathode such as an air cathode, for example.

The anode 12 comprises a solid body 16 of a reactive metal, such as lithium, for example. The body 16 defines a surface 20 which is spaced from a cathode surface 22 to define a reaction space 23 by means of a rigid screen 24, as is well known in the art. The screen is preferably of a polyolefin such as polyethylene or polypropylene. The use of polytetrafluoroethylene should be avoided, however, as it energetically reacts with alkali metals.

Dispersed throughout the anode body 16 is a network, generally designated 26, comprising a plurality of discrete individual fibers 30 of an electrically insulating material. Such fibers are selected to be nonreactive with the materials of construction of the anode 12, cathode 14, screen 24 and the electrolyte which will be used in the cell. Additionally, the density of the fibers 30 should be such that the fibers can be mixed with and uniformly dispersed through the material which forms the body 16.

The percentage loading of the fibers 30 and the body 16 can be varied widely, and is dictated primarily by the desired degree of turbulence which will be created thereby, although the maximum loading will depend upon the ability of the material forming the body 16 to maintain its integrity.

Suitable materials for forming the fibers 30 include ceramic materials as well as various synthetic polymers. One type of preferred polymer is the class of aromatic polyamides, also referred to as "aramides", such as those marketed under the trademarks Kevlar and Nomex by E. I. duPont de Nemours & Co.

In operation of the cell 10 of FIGS. 1-3, an electrolyte will flow through the reaction space 23 in the direction indicated by the arrow 32. As is well known in the art, the electrolyte may be aqueous or nonaqueous, and may contain any of a variety of inorganic or organic additives. When the anode 12 comprises lithium, the electrolyte is preferably an aqueous solution of lithium hydroxide (LiOH).

As electrolyte flows through the reaction space 23, an electrochemical reaction occurs at the surface 20 of the anode 12 whereby the reactive metal in the anode 12 is consumed. FIG. 1 illustrates the cell 10 before a flow of electrolyte begins. FIG. 2 illustrates the cell 10 very shortly after the initiation of operation wherein a number of ends 34 of individual fibers 30 are exposed and extend from the surface 20 due to the erosion of the surface 20 by the electrochemical reaction.

As the operation of the cell proceeds, as seen in FIG. 3, the surface 20 has eroded even further, thus exposing numerous fiber ends 34.

Due to the erosion of the surface 20, the reaction space 23 increases in size in the transverse direction as the reaction proceeds. However, due to the exposure of fiber ends 34 and their extension into the reaction space 23, local turbulence of the flowing electrolyte adjacent the anode surface 20 is promoted. This promotes the removal of products of reaction and provides fresh electrolyte to the exposed surface 20 for reaction, thus maximizing the rate of reaction and, thus, the rate of electrical output of the cell 10.

As shown in FIG. 3, some fiber ends, designated 36, may break off from the fibers 30 during operation. This can be undesirable, as such fiber ends 36 tend to become trapped in the screen 24, if present, and thus interfere with electrolyte flow between the electrodes 12 and 14. The embodiment of FIG. 4, however, can overcome such problems, as set forth below.

Figure 4:
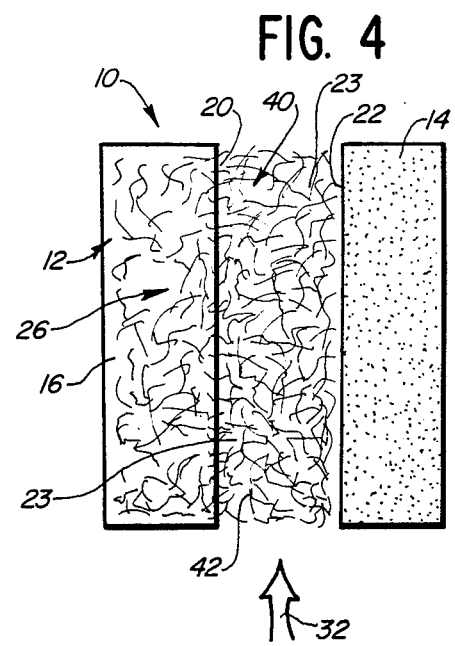
FIG. 4 schematically illustrates an electrochemical cell incorporating a modified embodiment of the electrode of the invention.

In FIG. 4, the reinforcing network 26 of the anode 12 comprises a unitary mass, generally designated 40, of reticulated foam partially embedded in the anode body 16 and extending through the anode surface 20 into the reaction space 23 and, illustratively, into contact with the cathode surface 22.

In the embodiment of FIG. 4, the foam mass 40 comprises a resilient, compressible material, such as polyurethane, for example. From the foregoing, those skilled in the art will recognize that the material of the foam mass 40 need not be polyurethane, but may be any resilient, compressible material which is chemically and electrically inert with respect to the anode 12, the cathode 14, and the electrolyte.

Alternatively, the foam mass 40 may be of a rigid material such as a porous ceramic foam or a reticulated metal such as nickel. Such metal bodies should be coated with an electrically insulative material.

No separator screen is used in the cell 10 of FIG. 4, as the foam mass 40 spaces the cathode 14 from the anode 12. As electrolyte flows through the reaction space 23, the surface 20 of the anode 12 erodes, thus exposing additional fibers of the foam mass 40. Since the mass 40 is dispersed throughout the anode body 16, sufficient individual fibers 42 of the foam mass will always extend from the anode surface 20 to provide local turbulence thereat. Additionally, when the foam mass 40 is compressible and resilient, erosion of the anode surface 20 allows the fibers 42 to expand and thus maintain close contact with the cathode surface 22.

In at least one sense, the embodiment of FIG. 4 represents an improvement over that of FIGS. 1-3 since individual, discrete fibers can tend to agglomerate or, in some cases, may not be evenly dispersed throughout the electrode body 16. Also, individual fibers may break off within the reaction space 23. If fibers 42 of the foam mass 40 break they will be retained within the mass 40 since the network 26 is continuous.

Although the embodiment of FIG. 4 does not illustrate the use of a separator screen, such a screen may be used and, in such a case, the screen will not become clogged by broken fibers for the reasons set forth above.

Additionally, the inter-fiber spacing of the network 26 of FIG. 4 is, in general, more uniform than that of the embodiment of FIGS. 1-3 because foams such as the foam mass 40 of FIG. 4 having relatively uniform porosities are widely available.

The fibrous network 26 of FIG. 4 is stronger than a dispersion of discrete fibers and, as a result, can be used at lower fiber loadings, thus minimizing any weight or volume increase.

An anode 12 such as shown in FIGS. 1-4 can readily be prepared by compression of reactive metal powder under pressure with the fibers 30 or reticulated foam 40. Compression forming of an electrode can also be carried out by compressing a layer of foam and/or a screen between two layers of reactive metal, as between compression rollers, for example.

Figure 5:
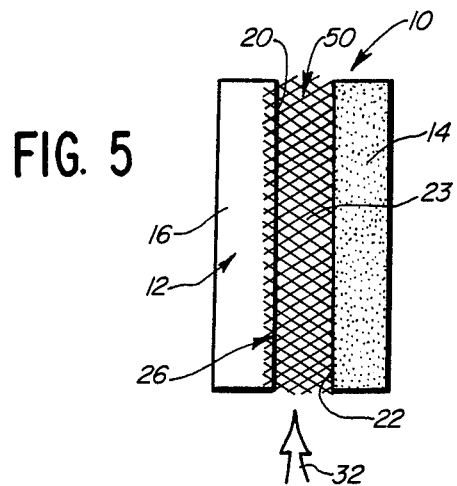
FIG. 5 is a schematic illustration of an electrochemical cell incorporating a further embodiment of the electrode of the invention.

FIG. 5 schematically illustrates a further embodiment of the invention wherein the fibrous network 26 within the anode body 16 comprises elements of a rigid screen, generally designated 50, at least partially embedded into the anode body 16 and extending through the anode surface 20 into the inter-electrode reaction space 23.

In FIG. 5, the screen 50 comprises metal coated with a nonconductive material, or another rigid material, such as a rigid synthetic polymer, for example. One preferred type of rigid polymer is polypropylene.

The anode 12 of FIG. 5 may readily be prepared by compression molding of the screen 15 into the surface 20 of the anode body 16. The embodiment of FIG. 5 illustrates the screen 50 only partially embedded into the anode body 16 but, of course, the screen 50 may extend throughout of the anode body 16, if desired.

The embodiment of FIG. 5 has the advantage of providing additional support for both the anode and cathode, allowing the positions of both electrodes to be fixed without the attendant disadvantages which would otherwise result from erosion of the anode surface 20. As the anode surface 20 erodes during operation, turbulence at the surface 20 will be maintained by the screen 50.

The embodiment of FIG. 5 has the additional advantage of providing uniform fixed pore size in the structure of the network 26, so that the presence of any compressive forces will not interfere with electrolyte flow and production of electrical energy. Also, the screen 50, if metal, enhances the thermal conductivity of the anode 12.

In the exemplary embodiment of FIG. 5, the anode 12 may be spaced from the cathode 14 by, for example, 14 mils, and the thickness of the screen 50 may be 16 mils or more. An excellent material of construction for the screen 50 is Style No. 7715 polypropylene screen, available from Lamport's Filter Media of Cleveland, Ohio.

EXAMPLES

EXAMPLE 1

Figure 6:
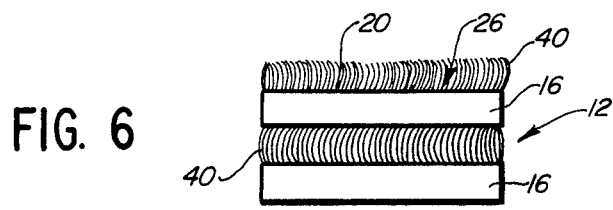
FIG. 6 schematically illustrates one step in a method of constructing an embodiment of an electrode of the invention; and, FIG. 7 is a schematic illustration of an electrochemical cell incorporating the electrode of FIG. 6.
Figure 7:
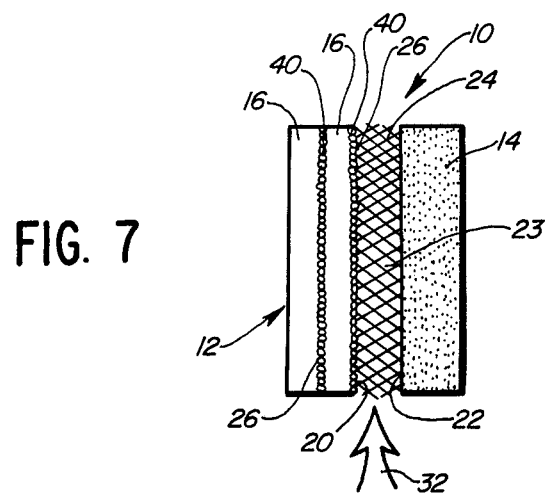

FIGS. 6 and 7 illustrate a specific embodiment of an anode 12, and a cell 10 incorporating such an anode, respectively, made according to the invention. In FIG. 6, an anode 12 comprises a sandwich of alternate layers of reactive metal bodies 16 and reticulated compressible foam layers 40. Illustratively, each body 16 comprises a layer of lithium initially 45 mils thick but, as shown in FIG. 6, flattened under pressure to 30 mils thick.

Illustratively, the foam mass 40 comprises Type IV reticulated military foam (polyurethane) having 20 to 30 pores per lineal inch.

After assembly as shown in FIG. 6, the entire structure 12 is compressed to 50 mils total thickness and, finally, to 44 mils total thickness as shown in FIG. 7.

As shown in FIG. 7, the foam masses 40 are embedded into the lithium layers 16 to define fibrous networks 26, and one such network 26 extends through a surface 20 of one layer 16.

In FIG. 7 the anode 12 is spaced from a silver oxide cathode 14 by 10 mils, and the spacing is maintained by rigid polypropylene screen 24. As noted above, such a screen 24 is optional.

If desired, a small gap may be maintained between the screen 24 and the anode surface 20 and the network 26 extending therefrom at the beginning of cell operation. During operation of the cell, however, the foam mass 40 will expand to fill any such gap.

A cell corresponding to the cell 10 of FIG. 7 was constructed with a 10 mil screen 24 and a 15 mil gap corresponding to the reaction space 23, and the cell was operated with 4.3 molar aqueous lithium hydroxide at 45° C. The thickness of the silver oxide cathode 14 was 34 mils and the thickness of the anode 12 was 44 mils. The surface area of the anode surface 20 was 25.8 cm$^2$.

Operation of the cell as described above resulted in a voltage of 2.2 V and a current density of 0.62 A/cm$^2$ (a current of 16 amps). The recorded voltage versus time curve was extremely flat for more than 11 minutes. This differs from prior lithium/silver oxide cells in which current output varies over time.

Since there was a gap between the separator screen 24 and the anode surface 20 at the start of the test, there was a short induction period in which voltage was lower than 2.2 volts. However, this quickly disappeared as the anode surface eroded and the foam 40 extending through the surface 20 expanded to fill the gap.

During the test, it was found that the electrolyte flow rate could be decreased without a loss in voltage or current, thus demonstrating the enhancement of the electrochemical reaction rate due to the presence of the fibrous network 26 extending from the anode body 16 through the anode surface 20.

It is clear that, without the fibrous network 26, successful operation of the cell would require an increase in the electrolyte flow rate as the size of the gap increased.

An additional advantage deriving from the electrode and cell of the invention is the simplification of the assembly process, since an additional foam or screen separator is not required. This is especially important in the assembly of multicell modules.

In many multicell modules, the anode is disposed directly on a backing plate of nickel or other metal. Since, according to the invention, the anode wears much more uniformly than those of the prior art, the tendency of the anode to "pit" is greatly diminished, thus minimizing or eliminating breakthrough of the anode to the metal backing plate.

EXAMPLE 2

A comparative test between one embodiment of the electrochemical cell of the invention and a prior art cell was carried out as follows. The prior art cell comprised an elemental lithium anode and a porous silver oxide cathode space therefrom. In each case, the respective surface areas of the anode and cathode were substantially identical to those of the cell of Example 1.

In the prior art cell, the thickness of the lithium anode was 25 mils, with an initial inter-electrode gap of 15 mils. A polypropylene screen substantially identical to the screen 24 of FIG. 7 and having a thickness of 10 mils was positioned against the cathode surface, and the remaining gap was filled with 20 ppi Type IV Military Foam (polyurethane).

In the cell made according to the invention, the anode was made identically to the anode 12 illustrated in FIG. 4, with a 25 mil thickness of elemental lithium having a unitary reticulated polyurethane foam dispersed therethrough, for a total anode thickness of 28 mils.

An initial inter-electrode gap of 14 mils was established, with the gap filled with a polypropylene screen such as the screen 24 of FIG. 7. The polypropylene screen had a thickness of 17 mils, with about 3 mils embedded into the lithium surface by compression. Thus, it was ensured that flow-by of electrolyte would be eliminated.

Each cell is operated under the conditions as set forth in Example 1. It was found that each cell produced full power of at least 2.0 volts at a current density of 0.62 amps/cm$^2$. However, the prior art cell maintained full power for only about 6½ minutes, while the inventive cell maintained full power for 7.7 minutes.

The foregoing demonstrates that the performance of the inventive electrode and cell with respect to current density was somewhat better than the performance of an otherwise equivalent prior art system in which foam was not embedded in the anode, but was present in the initial inter-electrode gap. The basic flow rate characteristics in each case were similar. This verifies the utility and enhanced characteristics of the use of an integral anode structure, without the attendant difficulties of the prior art. The demonstrably improved capacity of the cell to run at full power for longer periods of time demonstrates the fact that the inventive cell more effectively utilizes the reactive metal in the anode.

The foregoing detailed description is given for clearness of understanding only, and no unnecessary limitations should be understood therefrom, as modifications within the scope of the invention will be obvious to those skilled in the art.

I claim:

1. An electrode suitable for use in an electrochemical cell, comprising:
   (a) a solid body of a reactive metal which is consumable by reaction with a liquid electrolyte, said body defining at least one surface to be contacted by said electrolyte during operation;
   (b) a fibrous network of electrically insulating reinforcing material at least partially embedded in said body with at least a portion of said network disposed in said body in close proximity to said surface for contact with said electrolyte as metal at said surface is consumed by reaction with said electrolyte.

2. The electrode of claim 1 wherein said network extends from said body through said surface.

3. The electrode of claim 1 wherein said network is entirely contained within said body.

4. The electrode of claim 1 wherein said network comprises a plurality of discrete fibers.

5. The electrode of claim 4 wherein said fibers are of a material selected from the group consisting of ceramic materials and synthetic polymers.

6. The electrode of claim 5 wherein said synthetic polymer is an aromatic polyamide.

7. The electrode of claim 4 wherein said fibers are dispersed in said body as bundles of fibers.

8. The electrode of claim 1 wherein said fibrous network comprises reticulated foam.

9. The electrode of claim 8 wherein said foam is of a resilient compressible material.

10. The electrode of claim 9 wherein said compressible material is a synthetic polymer.

11. The electrode of claim 10 wherein said synthetic polymer is polyurethane.

12. The electrode of claim 8 wherein said foam is rigid.

13. The electrode of claim 12 wherein said foam comprises a rigid three-dimensional screen.

14. The electrode of claim 13 wherein said screen is of a material selected from the group consisting of rigid synthetic polymers and metal.

15. The electrode of claim 14 wherein said screen is of rigid polypropylene.

16. The electrode of claim 14 wherein said screen comprises metal coated with an electrically insulated material.

17. An electrochemical cell comprising an anode, a cathode spaced from said anode to define a reaction space, and means externally connecting said anode and said cathode to define an electrical circuit, said anode comprising the electrode of claim 1.

18. The cell of claim 17 wherein the reactive metal of said anode comprises an alkali metal.

19. The cell of claim 18 wherein said alkali metal comprises lithium.

20. The cell of claim 17 wherein the fibrous network of said anode comprises reticulated foam of a resilient compressible material extending from the body of said anode through said anode surface into said reaction space.

21. The cell of claim 17 wherein said anode and said cathode are separated by a means selected from the group consisting of a rigid screen and reticulated compressible foam.

22. A method of generating electrical energy comprising the step of introducing an electrolyte into the reaction space defined between the anode and cathode of the electrochemical cell of claim 17.

* * * * *